3,475,240
METHOD OF PREPARING DECORATIVE STAINLESS STEEL LAMINATE
Kazuo Manaka, Kawasaki-shi, and Shinpei Kurihara, Nagoya-shi, Japan, assignors to Tokyo Shibaura Electric Co., Ltd., Kawasaki-shi, Japan, a corporation of Japan
Filed Feb. 16, 1966, Ser. No. 527,890
Claims priority, application Japan, Feb. 17, 1965, 40/8,622
Int. Cl. C23f 1/00
U.S. Cl. 156—3    4 Claims

ABSTRACT OF THE DISCLOSURE

A decorative laminate composed of a thin surface layer of stainless steel sheet bonded to laminated sheets of fibrous material containing phenolic resin.

---

This invention relates to a novel decorative laminate, particularly that of stainless steel sheet, similar to the conventional decorative laminate of melamine resin, but having more desirable properties.

Decorative laminates of melamine resin are now widely used as the material for many kinds of furniture, walls or doors, owing to their high resistances to corrosion, abrasion, impingement and heat, and to their smooth level as well as their attractive appearance. However, such decorative laminates are used only in the flat form because it is difficult to bend or curve them owing to the extreme hardness and brittleness of the cured melamine resin. In addition, since the cured melamine resin is extremely brittle, it is impossible to drill or perforate through the laminates, so that their use is limited to such applications where the plates can be cemented to flat substrata to utilize their flat and imperforate surfaces. Further, it is impossible to unite two laminates of melamine resin by soldering their surface layers.

It is an object of this invention to provide a decorative laminate which has improved mechanical strength in addition to various advantageous properties of the decorative laminate of melamine resin mentioned above.

Another object of this invention is to provide a decorative laminate having flexible surface layers which can be readily curved and bent.

A further object of this invention is to provide an improved decorative laminate which can be provided with drilled holes or perforations of any desired shape.

A still further object of this invention is to provide an improved decorative laminate wherein the surfaces of two adjacent plates can be soldered into a continuous surface.

The above objects can be attained in accordance with the present invention by using a thin sheet of stainless steel instead of melamine resin as the surface layer substance of the decorative laminate.

Briefly stated, this invention provides a novel decorative laminate comprising a sheet of stainless steel and a layer of laminated base body of cured phenolic resin firmly bonded by a suitable adhesive to said sheet of stainless steel. The laminated body is made of a plurality of sheets of fibrous material, paper for example, which are impregnated in advance with the primary condensation product of phenolic resin. After piling the sheets and placing a thin sheet of stainless steel on the pile after applying an adhesive to the stainless steel, they are cured under heat and pressure into a united rigid body.

The features of the invention which are believed to be novel are set forth with particularity in the appended claims. The invention itself, however as to its organization together with further objects and advantages thereof, may best be understood by reference to the following description taken in connection with the accompanying drawings, in which:

Figure 3:
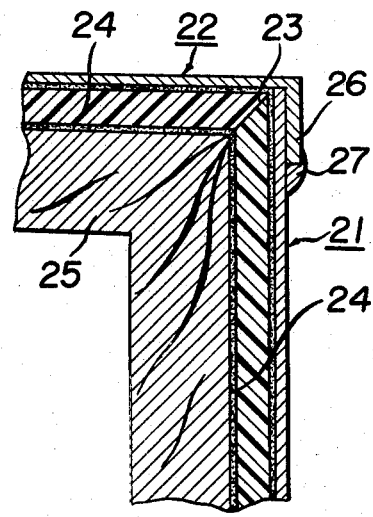
Figure 4:
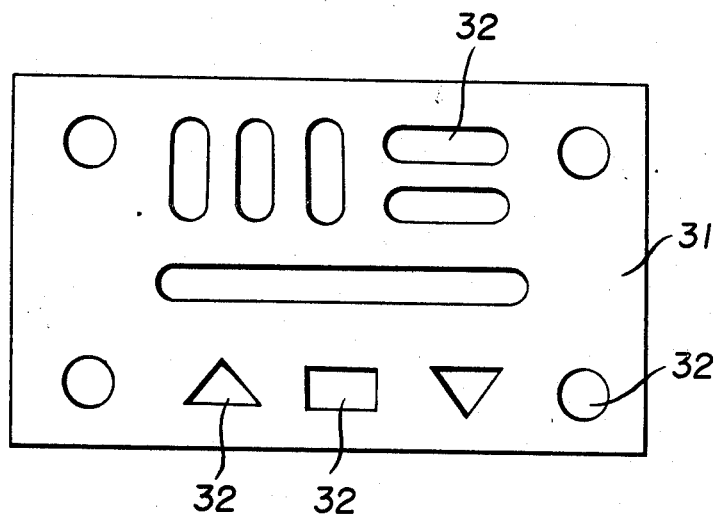

FIG. 3 is an enlarged cross-sectional view of a corner of an article including a pair of decorative laminates of the present invention bonded to wooden substrate intersecting at right angle, and surfaces of them are soldered at a near line to the corner part; and, FIG. 4 is a diagrammatic plane view of a decorative laminate of the present invention which has various figures of perforated holes through the laminate.

Conventional decorative laminates of melamine resin are characterized by their hard and durable surfaces. However, as the surfaces are brittle and difficult to bend, it has been recognized in the art that they can not be used for the manufacture of such articles as kitchen cabinets laboratory desks and the like which are often subjected to strong friction during their use. Accordingly, it is common to use plates of stainless steel having large mechanical strength and large resistance against corrosion as a covering material of such articles. Generally, the plates of stainless steel having a thickness of from 0.5 to 1.0 mm. are used in order to withstand this hard use and friction, and it is almost impossible to firmly bond such relatively thick plates to the wooden substrate. As a result the peripheral edges of the stainless steel plate are bent around the edges of the substrate, and then are fastened to the surface thereof, while the corners of the bent periphery are welded or overlapped and are then fixed to the substrate by nails and the like. With such a construction, however, nails become corroded and then the substrate also becomes corroded. Moreover, as the stainless steel plate is secured to the substrate only around its periphery and is not firmly bonded to the substrate over its entire surface, deformation of the stainless plate due to temperature variation, mechanical shocks and the like is inevitable. In addition, when the cover of stainless plate is subjected to a strong local friction because of use will be deformed, have recess, etc. so that it is necessary to use relatively thick plates of about 0.5 to 1.0 mm., which of course increases the manufacturing cost of the articles.

We have made a radical improvement in the conventional decorative laminates comprising melamine resin. According to the present invention, a thin sheet of stainless steel is used as the surface layer of the decorative laminate. More particularly, a suitable adhesive is applied to the rear surface of a relatively thin sheet of stainless steel, of the thickness of from 0.05 to 0.5 mm., and the sheet is then superposed upon a plurality of laminated papers or other materials which have been impregnated in advance with a suitable quantity of primary condensation product of phenolic resin. Thereafter the superposed assembly is heated at about 150° C. for about 30 minutes under a pressure of about 200 kilograms per square centimeter, so as to obtain a cured laminated plate having a thin sheet of stainless steel firmly bonded to the phenolic laminate.

The adhesive to be applied on the rear surface of the thin sheet of stainless steel should be able to cure within about 30 minutes at a temperature of about 150° C. and also should have an ability to firmly bond the metal and the synthetic resin. We have found that a mixture consisting of epoxy-novolak resin and polyamide resin is suitable for this purpose.

At first, the rear surface of the sheet of stainless steel is cleaned and roughened by rubbing it with a sand paper or by etching with a suitable chemical agent, and then either one of said adhesives is applied on the cleaned surface. The sheet of stainless steel is then superposed upon a plurality of laminated fibrous sheets impregnated with primary condensation product of phenolic resin, and the assembly is then heated under the pressure to obtain a united laminate as described above.

Figure 1:
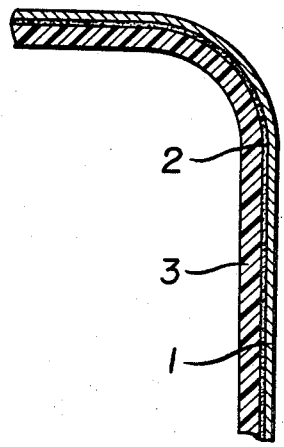
FIG. 1 is an enlarged cross-sectional view of a bent decorative laminate of the present invention.

The decorative laminate thus obtained has a beautiful surface of clean metallic luster, and some elasticity. For example, as shown in FIG. 1, the laminate plate of this invention can be worked into a curved article which is impossible to obtain with conventional melamine decorative laminates. In FIG. 1 there is shown a flat sheet of stainless steel 1 adhered to a laminate 3 consisting of a plurality of fibrous sheets impregnated with primary condensation product of phenolic resin by means of the adhesive 2 of the type referred to above. After curing the flat laminate by the process outlined hereinabove, the plate was bent into the configuration shown in FIG. 1 by mechanical force. When bending the laminated plate, care should be taken to avoid too small a radius of curvature, otherwise the phenolic resin layer would be fractured. While the minimum radius of curvature is more or less dependent upon the thickness of the phenolic resin layer, the lower limit of the radius of curvature was found to be about 20 mm. for the thickness of the phenolic resin layer of 2 mm. The curved laminated plate thus obtained is then suitably cemented to a substratum having the same radius of curvature.

Figure 2:
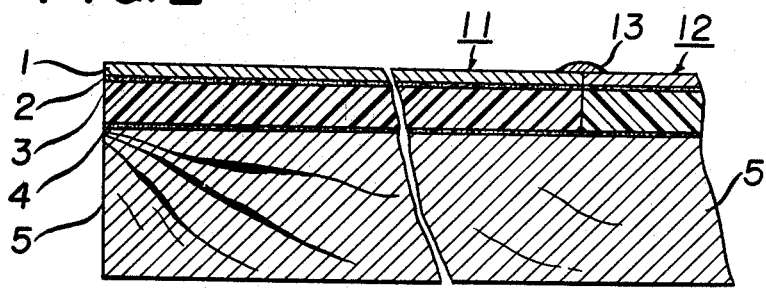
FIG. 2 is an enlarged cross-sectional view of a decorative laminate of the present invention bonded to a wooden substratum, including a soldered part of two adjacent laminates.

FIG. 2 shows a cross-section of a portion of an article comprising a flat decorative laminate bonded to a wooden substratum. More particularly the invented laminate consisting of a thin sheet of stainless steel 1, a layer of adhesive 2 and a cured laminate 3 of phenolic resin is bonded to a wooden substratum 5 by means of a conventional bonding agent 4. The bonding agent 4 is not required to have as strong a bonding ability as the adhesive 2, but may be any one of the well known conventional bonding agents that can be commonly used at low temperatures, for example at a room temperature. Examples of these bonding agents are those containing synthetic rubber or urea resin.

The decorative laminate embodying this invention is characterized by the surface layer of stainless steel which is well polished to provide beautiful metallic luster. When decorative patterns are provided on the surface of the stainless steel sheet as by an etching process, the articles of more attractive appearance can be formed. Since it is different from the layer of melamine resin, the stainless steel sheet has higher mechanical strength, and moreover, as it is stuck to the hard laminate layer of phenolic resin, it also has higher shock proof strength. For these reasons articles having surface plates of this invention can be handled more roughly without causing any damage or fracture on the surface thereof. In addition, since the surface layer of stainless steel is firmly adhered to the base material resin, there is no fear of partial or complete separation of the surface layer even though the articles are handled roughly. Further as the stainless steel sheet of this invented laminate is far thinner than those utilized in prior articles, it can be fabricated to have smaller weight at cheaper cost.

Another feature of the decorative laminate of this invention is that it can be readily united into a continuous and unitary structure by soldering. This is shown in FIG. 2. Thus, two adjacent sections 11 and 12 of this laminated plate which are bonded to a common wooden substratum 5 are united together by soldering 13. As already pointed out, the surface layer of melamine resin of prior decorative laminates are impossible to unite together to provide a seamless surface.

In FIG. 3 two decorative laminates of this invention are shown bonded to outer surfaces, intersecting at right angles, of a wooden substrate with one of the stainless sheets of the laminates bent at right angles to overlap the other sheet and soldered thereto. More particularly, one end of the phenolic resin layer of one of the decorative laminates 21 is beveled at 45° as shown by the reference numeral 23, and is then bonded to the wooden substrate 25 by means of a bonding agent 24 with the beveled surface positioned at the corner of the substrate. The corresponding end of the phenolic resin layer of the other laminate 22 is also beveled at 45° to expose a portion 26 of the stainless steel sheet. Then the laminate 22 is bonded to the other side of the substrate by means of the same bonding agent 24 to cause beveled surfaces to abut as shown in FIG. 3. It is preferable also to bond together these beveled surfaces by the bonding agent. Then, the exposed portion 26 of the stainless steel sheet is bent upon the upper surface of the laminate 21 and firmly bonded thereto by soldering 27. Instead of exposing and bending a portion 26 of the stainless steel sheet, the abutting ends of both laminates may be beveled at 45° and a line of abutment between adjacent stainless steel sheets may be soldered.

A still further feature of the decorative laminate of this invention lies in the fact that the plate 31 can be provided with perforations 32 of any desired configuration, as diagrammatically shown in FIG. 4. Such a perforation capability is absolutely impossible with the prior melamine decorative laminates. As a result, the decorative plates of this invention can be used for the fabrication of radio, television and similar electric apparatus as well as metering instruments. Further the plates can be directly mounted on various structures by using suitable fastening means such as bolts and nuts, et cetera, without being bonded to the substrate, thus greatly widening their field of application. Even when bonded to a substrate they can be used in similar fields as conventional melamine laminates but with a different beautiful appearance. Besides they can be used in such articles as refrigerator cabinets where relatively heavy stainless steel plates have been used as inside linings as well as outside walls, thus greatly saving expensive stainless steel plate.

Firmly bonded and perfectly flat laminates can be obtained only when a thin stainless steel sheet having a rear coating of a suitable adhesive is placed on a plurality of laminated fibrous sheets impregnated with resol. The assembly should then be heated at a temperature of about 150° C. under a pressure of about 200 kilograms per square centimeter. The laminated plates containing a sheet of stainless steel prepared in this manner can be readily bonded to any desired substrate at room temperature by using a conventional bonding agent. The substrate may be made of any material such as metal, cement mortar, concrete, etc., in addition to wood.

Since the underlayer of phenolic resin laminate is hard and strong, and yet has a certain degree of resiliency, even if the surface of the laminate herein described is subjected to mechanical shocks caused by falling objects and the like, it will not be damaged or depressed. The thickness of the underlayer of phenolic resin laminate is preferably in a range of from 0.5 mm. to 2.0 mm., but may be varied depending upon the particular application.

For the purpose of giving those skilled in the art a better understanding of the invention, the following specific examples are given by way of illustration:

EXAMPLE 1

After cleaning the rear surface of 18–8 Cr-Ni stainless steel sheet having a thickness of 0.2 mm. and dimensions of 1000 mm. x 1000 mm. area using petroleum ether, a 50% aqueous solution of ferric chloride was applied to the cleaned rear surface allowing to stand for 5 minutes whereby to coarsen it by etching. Then the surface was washed with water and dried. The adhesive was prepared by mixing 3 parts, by weight, of 20% concentration solution obtained by dissolving into tetrahydrofuran solvent an epoxy-novolak type resin, which is a partially epoxydized phenolic resin of the novolak type, and 4 parts, by weight, of a 15% concentration solution obtained by dissolving a copolymer of polyamides consisting of 6-nylon, 6,6-nylon and 6,10-nylon in methanol solvent. The adhesive was applied to the etched surface of the stainless steel sheet in an amount of about 130 grams per square meter, and the coated surface was dried at room temperature to evaporate off the solvents. The stainless steel sheet was then put on a pile of 10 sheets of paper containing a suitable quantity of primary condensation product of phenolic resin, and the assembly was then heated to 150° C. for 30 minutes under a uniform pressure of 200 kilograms per square centimeter to obtain a flat laminated plate of the total thickness of 1.2 mm. This decorative laminate was used in various applications as described before with satisfactory results.

EXAMPLE 2

The same steps of the process were followed as in Example 1 with the exception that a modified adhesive was employed which was prepared by dissolving polyurethane resin of the isocyanate type containing 50%, by weight, of isocyanate as a curing agent in ethyl acetate solvent to obtain a solution of 60% concentration by weight. A satisfactory decorative laminate was produced.

The rear surface of this laminate was rubbed with a sand paper to make it coarse, and coated with the bonding agent of urea resin. The laminate was then placed upon a wooden plate of 15 mm. thick, and the assembly was pressed by a pressure of 10 kilograms per square centimeter at a temperature of about 80° C. for 10 minutes to obtain a plywood or a composite board. The laminated plate was firmly bonded to provide sufficiently large resistance against mechanical shocks. For example, it was found that the area of the depression formed on the surface of the composite board by dropping a steel ball of 30 grams from a height of 500 millimeters was comparable to that formed by dropping the same ball on a single staining steel plate 1.2 mm. thick.

The average specific gravity of this laminate was 2.6, which is far smaller than the specific gravity 8 of stainless steel.

What is claimed is:

1. A method of preparing a decorative laminate comprising the steps of chemically etching the rear surface of a thin sheet of stainless steel to provide a roughened rear surface, applying a heat curable adhesive to said roughened rear surface, placing the sheet of stainless steel upon a pile comprising a plurality of sheets of laminated fibrous material containing the initial condensation product of phenolic resin, and heating the resulting assembly to a temperature of about 150° C. under a pressure of about 200 kilograms per square centimeter to cure the phenolic resin and, in addition, adhesively bonding said assembly to a wooden support layer to produce a product with high impact strength.

2. The method of preparing a decorative laminate according to claim 1 wherein said heat curable adhesive comprises an epoxy-novolak resin and a polyamide resin.

3. The method of preparing a decorative laminate according to claim 1 wherein said sheet of stainless steel has a thickness of from 0.05 to 0.5 mm.

4. The method of preparing a decorative laminate according to claim 1 wherein said plural sheets of laminated fibrous material have a thickness of from 0.5 to 2.0 mm.

References Cited

UNITED STATES PATENTS

| | | | |
|---|---|---|---|
| 2,581,926 | 1/1952 | Groten et al. | 156—331 X |
| 2,712,001 | 6/1955 | Greenlee | 161—186 X |
| 2,962,468 | 11/1960 | Groves | 156—330 X |
| 3,234,060 | 2/1966 | Casement | 156—3 |
| 3,340,137 | 9/1967 | Kamal | 156—330 X |
| 2,606,855 | 8/1952 | Jenkins. | |
| 3,373,071 | 3/1968 | Fuerst | 156—335 X |

HAROLD ANSHER, Primary Examiner

R. A. KILLWORTH, Assistant Examiner

U.S. Cl. X.R.

156—330, 331, 335; 161—186, 214, 261